United States Patent
Mizutani

(10) Patent No.: US 6,657,004 B2
(45) Date of Patent: Dec. 2, 2003

(54) FILM FOR PACKAGING CHEMICAL AGENTS

(75) Inventor: Tomoyoshi Mizutani, Ibaraki (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 71 days.

(21) Appl. No.: 09/855,467

(22) Filed: May 15, 2001

(65) Prior Publication Data

US 2002/0009596 A1 Jan. 24, 2002

(30) Foreign Application Priority Data

May 16, 2000 (JP) ........................................ 2000/142942

(51) Int. Cl.[7] .............................................. C08L 29/04
(52) U.S. Cl. ............................. 525/57; 525/56; 525/59; 525/60
(58) Field of Search ............................. 525/57, 59, 60, 525/56

(56) References Cited

U.S. PATENT DOCUMENTS

| | | | | |
|---|---|---|---|---|
| 3,033,841 A | * | 5/1962 | Germain | 525/56 |
| 3,143,532 A | * | 8/1964 | Kahrs et al. | 526/209 |
| 3,322,703 A | * | 5/1967 | Lindemann | 524/21 |
| 4,826,917 A | * | 5/1989 | Kondo et al. | 524/459 |
| 5,316,688 A | * | 5/1994 | Gladfelter et al. | 252/90 |
| 5,373,054 A | * | 12/1994 | Sanuki et al. | 525/57 |
| 6,107,426 A | * | 8/2000 | Shibutani | 526/320 |
| 6,166,117 A | * | 12/2000 | Miyazaki | 524/284 |

FOREIGN PATENT DOCUMENTS

| | | | |
|---|---|---|---|
| EP | 0 884 352 A1 | * | 12/1998 |
| JP | 46 035972 | | 10/1971 |
| JP | 03059059 A | * | 3/1991 |
| JP | 405017653 A | * | 1/1993 |
| JP | 06136138 A | * | 5/1994 |
| JP | 07 041633 | | 2/1995 |
| JP | 09-272774 | | 10/1997 |
| JP | 09-316270 | | 12/1997 |
| JP | 63-168437 | | 7/1998 |
| JP | 411222546 A | * | 8/1999 |

* cited by examiner

*Primary Examiner*—Judy M. Reddick
(74) *Attorney, Agent, or Firm*—Leydig, Voit & Meyer, Ltd.

(57) ABSTRACT

The present invention provides a film for packaging chemical agents, which contains an oxyalkylene unit-containing polyvinyl alcohol resin (A) and a carboxyl-containing polyvinyl alcohol resin (B), and preferably further containing a sulfo-containing polyvinyl alcohol resin (C). This film shows fine solubility in water even after a long-term packaging of an acidic chemical agent or alkaline chemical agent, and is superior in mechanical strength. Thus, the film for packaging chemical agents of the present invention is suitably used for packaging a chemical agent, such as powdered soap, synthetic detergent, agricultural chemical, antibacterial, deodorant, insecticide and the like, which is cast into water when in use.

6 Claims, No Drawings

FILM FOR PACKAGING CHEMICAL AGENTS

TECHNICAL FIELD OF THE INVENTION

The present invention relates to a film for packaging chemical agents, which film comprising an oxyalkylene-containing polyvinyl alcohol resin (hereinafter sometimes to be abbreviated as EO-PVA) and a carboxyl-containing polyvinyl alcohol resin (hereinafter sometimes to be abbreviated as C-PVA).

BACKGROUND OF THE INVENTION

It has been conventionally proposed to divide (unit package) chemical agents, such as agricultural chemicals, detergents and the like, by placing them in bags made of a polyvinyl alcohol (hereinafter sometimes to be abbreviated as PVA) resin film, because PVA has water-soluble property.

However, a long-term storage of a chemical agent and the like in a bag made of a PVA film sometimes results in a failure to retain the water-soluble property inherent to PVA, thus leading to decreased solubility of the PVA film.

To prevent this, for example, the use of a sulfo-containing modified PVA film (JP-A-9-272774) and addition of a reducing agent and the like to a PVA film (JP-A-9-316270) have been proposed.

The inventor of this application has also proposed a film for packaging an alkaline substance, which film is made from PVA containing at least one of oxyalkylene, sulfo and cation (JP-A-63-168437).

However, there is a possibility of degraded film strength of the modified PVA film described in the above-mentioned JP-A-9-272774 when it is used to package an acidic substance having a low pH. Furthermore, because the modified PVA film described in JP-A-9-316270 contains a reducing agent and other additives, as mentioned above, these additives may exert an adverse influence on the chemical agent to be packaged, and the reducing agent may elute out when the film is dissolved, often causing disadvantages. Moreover, a film for packaging an alkaline substance, which is described in JP-A-63-168437, does not have a sufficient mechanical strength. Thus, there is a demand for the development of a film for packaging chemical agents, which is free of these problems.

SUMMARY OF THE INVENTION

It is therefore an object of the present invention to provide a film for packaging chemical agents, which is superior in water-soluble property and impact strength, and which is free of degradation of the water-soluble property even after a long-term storage of the chemical agent.

Such object can be achieved by the present invention described in the following.

Accordingly, the present invention provides the following.

(1) A film for packaging chemical agents, which comprises EO-PVA (A) and C-PVA (B).

(2) The film for packaging chemical agents of (1) above, wherein the EO-PVA (A) comprises an oxyalkylene unit in a proportion of 1–10 mol %, and the C-PVA (B) comprises carboxyl in a proportion of 1–10 mol %.

(3) The film for packaging chemical agents of (1) or (2) above, wherein the EO-PVA (A) and the C-PVA (B) are comprised in a weight ratio (A/B) of 50/50–80/20.

(4) The film for packaging chemical agents of (1) or (2) above, wherein the EO-PVA (A) and the C-PVA (B) are comprised in a weight ratio (A/B) of 60/40–80/20.

(5) The film for packaging chemical agents of (1) above, which further comprises S-PVA (C).

(6) The film for packaging chemical agents of (5) above, wherein the S-PVA (C) comprises sulfo in a proportion of 1–10 mol %.

(7) The film for packaging chemical agents of (5) or (6) above, wherein the S-PVA (C) is comprised in a proportion of 10–30 parts by weight per 100 parts by weight of the EO-PVA (A) and the C-PVA (B) in total.

(8) The film for packaging chemical agents of any of (1), (2), (5) and (6) above, which is used for packaging a chemical agent that shows a pH of not more than 5 or not less than 9, when dissolved or dispersed in water.

DETAILED DESCRIPTION OF THE INVENTION

The present invention is hereinafter explained by referring to the structural formulas and the like. In the numerous structural formulas recited in this specification, the numbers of moles n and m of repeating units in each structural formula do not mean the same in a different structural formula.

The EO-PVA (A) to be used in the present invention contains an oxyalkylene unit, which is specifically a PVA containing a group of the following formula (1):

In the above formula, $R_1$ and $R_2$ are each hydrogen or alkyl. The alkyl preferably has 1 to 6, particularly preferably 1 to 3, carbon atoms. Examples thereof include methyl, ethyl, isopropyl and the like.

X is an organic residue such as hydrogen, alkyl, acyl, alkylcarbonylamino, sulfonate (—$SO_3Na$ etc.) and the like.

The "n" (number of moles of oxyalkylene) is a positive integer. The "n" in the above formula (1) is not particularly limited, but is preferably 3–20, more preferably 4–19, particularly 5–18. When n is less than 3, the solubility (water-soluble property) tends to decrease, whereas when it exceeds 20, the film tends to show lower mechanical strength.

As the above-mentioned oxyalkylene, polyoxyethylene, polyoxypropylene, polyoxybutylene and the like are preferable.

EO-PVA can be produced by an optional method. For example, 1) vinyl ester compound is polymerized in the presence of polyoxyalkylene, which is followed by saponification, 2) unsaturated monomer having an oxyalkylene unit and vinyl ester compound are copolymerized, which is followed by saponification, and the like. The method 2) is practical from the aspects of production and properties of the resin.

The method 2) is explained in detail in the following.

Examples of unsaturated monomer having an oxyalkylene unit are as follows, to which the present invention is not limited.

[(meth)acrylic Acid Ester Type]

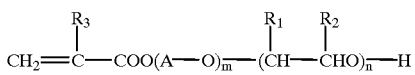
(2)

wherein $R_1$ and $R_2$ are as defined with regard to the formula (1), $R_3$ is hydrogen or methyl, A is alkylene, substituted alkylene, phenylene or substituted phenylene, m is an integer of not less than 0 and n is a positive integer, which is preferably 3 to 20. Specific examples include polyoxyethylene (meth)acrylate, polyoxypropylene (meth)acrylate and the like.

[(meth)acrylamide Type]

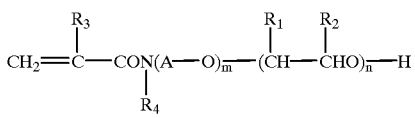
(3)

wherein $R_1$, $R_2$, $R_3$, A, n and m are as defined with regard to the formula (2), and $R_4$ is hydrogen, alkyl or a group of the following formula (4):

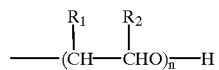
(4)

wherein $R_1$, $R_2$ and n are as defined with regard to the formula (2). Examples of such (meth)acrylamide type compound include polyoxyethylene (meth)acrylamide, polyoxypropylene (meth)acrylamide, polyoxyethylene (1-(meth)acrylamide-1,1-dimethylpropyl) ester and the like.

[(meth)allyl Alcohol Type]

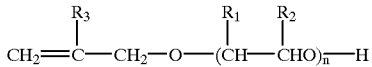
(5)

wherein $R_1$, $R_2$, $R_3$ and n are as defined with regard to the formula (2). Examples of such (meth)allyl alcohol type compound include polyoxyethylene (meth)allyl ether, polyoxypropylene (meth)allyl ether and the like.

[Vinyl Ether Type]

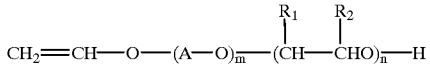
(6)

wherein $R_1$, $R_2$, A, n and m are as defined with regard to the formula (2). Examples of such compound include polyoxypropylene vinyl ether and the like.

Of the above-mentioned unsaturated monomers having an oxyalkylene unit, preferred is a (meth)allyl alcohol type compound.

EO-PVA can be also obtained by copolymerizing polyoxyalkylene allylamine (e.g., polyoxyethylene allylamine, polyoxypropylene allylamine etc.), polyoxyalkylene vinylamine (e.g., polyoxyethylene vinylamine, polyoxypropylene vinylamine etc.), and the like with a vinyl ester compound, which is followed by saponification.

Examples of vinyl ester compound include vinyl formate, vinyl acetate, vinyl trifluoroacetate, vinyl propionate, vinyl butyrate, vinyl caprate, vinyl laurate, vinyl versate, vinyl palmitate, vinyl stearate and the like, which can be used alone or in combination. From the practical viewpoint, vinyl acetate is preferably used.

In the context of the present invention, typical monomers other than the aforementioned unsaturated monomer having an oxyalkylene unit and vinyl ester compound may be added during polymerization to the extent that the water-soluble property is not impaired. Examples of such monomers are as follows.

[Ethylenically Unsaturated Carboxylic Acid, its Alkyl Ester and the Like]

methyl crotonate, ethyl crotonate, methyl itaconate, ethyl itaconate, methyl sorbate, ethyl sorbate, monoalkyl maleate, dialkyl maleate, alkyl oleate, methyl (meth)acrylate, ethyl (meth)acrylate, propyl (meth)acrylate, butyl (meth)acrylate, pentyl (meth)acrylate, heptyl (meth)acrylate, octyl (meth)acrylate, decyl (meth)acrylate, hexadecyl (meth)acrylate, octadecyl (meth)acrylate and the like

[Allyl Ester of Saturated Carboxylic Acid]

allyl stearate, allyl laurate, coconut oil fatty acid allyl ester, allyl octylate, allyl butyrate and the like

[α-olefin]

ethylene, propylene, α-hexene, α-octene, α-decene, α-dodecene, α-hexadecene, α-octadecene and the like

[Ethylenically Unsaturated Carboxylic Acid]

(meth)acrylic acid, crotonic acid, maleic acid (anhydride), fumaric acid, itaconic acid, alkaline metal salts thereof, ammonium salt thereof and the like

[Alkyl Vinyl Ether]

propyl vinyl ether, butyl vinyl ether, hexyl vinyl ether, octyl vinyl ether, decyl vinyl ether, dodecyl vinyl ether, tetradecyl vinyl ether, hexadecyl vinyl ether, octadecyl vinyl ether and the like

[Alkyl Allyl Ether]

propyl allyl ether, butyl allyl ether, hexyl allyl ether, octyl allyl ether, decyl allyl ether, dodecyl allyl ether, tetradecyl allyl ether, hexadecyl allyl ether, octadecyl allyl ether and the like Besides the above, (meth)acrylamide, (meth)acrylonitrile, styrene, vinyl chloride and the like can be used.

The method for copolymerization is not subject to any particular limitation and known polymerization method can be used as necessary.

Typically, solution polymerization using alcohol such as methanol, ethanol, isopropyl alcohol and the like as a solvent is performed. It is needless to say that emulsion polymerization and suspension polymerization can be performed. In the solution polymerization, a monomer can be charged in by, for example, charging the entire amount of a vinyl ester compound and a part of the aforementioned unsaturated monomer having the oxyalkylene unit to start polymerization, and adding the remaining unsaturated monomer continuously or by portions during the polymerization period, or all the components may be added at once or other optional method may be employed.

Copolymerization is carried out using a known radical polymerization catalyst such as azobisisobutyronitrile, acetyl peroxide, benzoyl peroxide, lauroyl peroxide and the like. The reaction temperature is from 50° C. to about the boiling point of the reaction mixture.

Saponification includes dissolving the copolymer in alcohol and allowing the reaction in the presence of an alkaline catalyst. Examples of alcohol include methanol, ethanol, butanol and the like. The concentration of copolymer in the alcohol is preferably 20–50 wt %.

Examples of the saponification catalyst include alkaline catalysts such as alkaline metal hydroxide and alcoholate (e.g., sodium hydroxide, potassium hydroxide, sodium methylate, sodium ethylate, potassium methylate and the like), and the use of the alkaline catalyst is essential. The amount of the catalyst is preferably 1–100 mmol equivalent of vinyl ester.

It is also possible to obtain EO-PVA by, for example, addition reaction of polyvinyl alcohol (partially saponified or completely saponified) with alkylene oxides and the like, besides the above-mentioned method.

In this way, EO-PVA (A) to be used in the present invention can be obtained. According to the present invention, an oxyalkylene unit content is preferably 1–10 mol %. When the content is less than 1 mol %, the solubility decreases and when it exceeds 10 mol %, the film strength becomes degraded. The more preferable lower limit of the content is 2 mol %, and the more preferable upper limit is 7 mol %, particularly 5 mol %.

The saponification degree of EO-PVA (A) is not particularly limited, but 70–98 mol % is preferable. When the saponification degree is less than 70 mol %, the solubility decreases and when it exceeds 98 mol %, the solubility also unpreferably decreases. The more preferable lower limit of the saponification degree is 75 mol %, particularly 80 mol %, and the more preferable upper limit is 97 mol %, particularly 96 mol %.

The mean degree of polymerization of EO-PVA (A) is not particularly limited, but 300–4000 is preferable. When the mean degree of polymerization is less than 300, the film shows lower mechanical strength, whereas when it exceeds 4000, the aqueous solution shows higher viscosity, which may cause inconvenience during film forming. The more preferable lower limit of the mean degree of polymerization is 400, particularly 500, and the more preferable upper limit thereof is 3000, particularly 2000.

The C-PVA (B) to be used in the present invention has carboxyl. This C-PVA (B), too, can be produced by an optional method. For example, 1) an unsaturated monomer having carboxyl and a vinyl ester compound are polymerized, which is followed by saponification, 2) a vinyl ester compound is polymerized in the presence of an alcohol having carboxyl or a compound having carboxyl and a functional group such as aldehyde, thiol and the like as a chain transfer agent, which is followed by saponification, and the like. These methods are explained in more detail in the following.

1) A method comprising polymerization of a monomer having carboxyl and a vinyl ester compound, followed by saponification.

Examples of the monomer having carboxyl include ethylenically unsaturated dicarboxylic acid (maleic acid, fumaric acid, itaconic acid and the like), ethylenically unsaturated carboxylic acid monoester (maleic acid monoalkyl ester, fumaric acid monoalkyl ester, itaconic acid monoalkyl ester and the like), ethylenically unsaturated dicarboxylic acid diester (maleic acid dialkyl ester, fumaric acid dialkyl ester, itaconic acid dialkyl ester and the like), ethylenically unsaturated carboxylic acid anhydride (maleic acid anhydride, itaconic acid anhydride and the like), (meth)acrylic acid and the like, and their salts. Of these, ethylenically unsaturated carboxylic acid monoester and a salt thereof are preferably used. As used herein, preferable examples of alkyl include those having 1 to 4 carbon atoms, such as methyl, ethyl, propyl, butyl and the like. As the salts, exemplified are alkaline metal salts such as sodium salt, potassium salt, ammonium salt and the like, to which the salt is not limited.

When carboxyl is introduced, the compound may be insolubilized because a lactone ring may be formed during the saponification or drying. To prevent this, a method already known to produce polyvinyl alcohol having high water solubility, which comprises copolymerization of vinyl acetate in an organic solvent in the presence of alkali in 0.5–2.0 molar equivalents of maleic acid or maleic anhydride, and saponification, or a method comprising substitution of Na of Na salt of carboxylic acid with a divalent metal (Ca, Mg, Cu and the like), and saponification is used.

2) A method comprising polymerizing a vinyl ester compound in the presence of an alcohol having carboxyl or a compound having carboxyl and a functional group such as aldehyde, thiol and the like as a chain transfer agent, which is followed by saponification.

For this method, a compound derived from thiol having particularly high chain transfer effect, such as the following compounds (7) to (9) and salts thereof, is used.

(7)

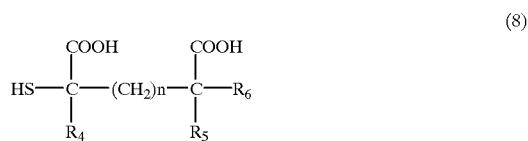

(8)

In the above-mentioned formulas (7) and (8), $R_4$, $R_5$ and $R_6$ are each hydrogen atom or lower alkyl (optionally having substituent), and n is an integer of 0–5.

(9)

wherein n is an integer of 0–20.

Examples of the salt include, but not limited to, alkaline metal salts such as sodium salt, potassium salt and the like, and ammonium salt.

Specifically, mercaptoacetic acid, 2-mercaptopropionic acid, 3-mercaptopropionic acid, 2-mercaptostearic acid, salts thereof and the like are exemplified.

As the vinyl ester compound for the production of the above-mentioned 1) and 2), those mentioned for the above-mentioned EO-PVA (A) can be used. In addition, other similar monomers can be used as long as the object of the present invention is not impaired.

Saponification can be carried out according to the saponification method of the above-mentioned EO-PVA (A).

In this way, C-PVA (B) to be used in the present invention can be obtained. According to the present invention, a carboxyl content (modified amount of carboxylic acid) is preferably 1–10 mol %. When the content is less than 1 mol %, the solubility decreases and when it exceeds 10 mol %, the film strength becomes degraded. The more preferable lower limit of the content is 1.2 mol %, particularly 1.5 mol %, and the more preferable upper limit is 7 mol %, particularly 5 mol %.

The saponification degree of C-PVA (B) is not particularly limited, but 70–98 mol % is preferable. When the saponification degree is less than 70 mol %, the solubility decreases and when it exceeds 98 mol %, it also unpreferably decreases. The more preferable lower limit of the saponification degree is 75 mol %, particularly 80 mol %, and the more preferable upper limit is 97 mol %, particularly 96 mol %.

Moreover, the mean degree of polymerization of C-PVA (B) is not particularly limited, but 300–4000 is preferable. When the mean degree of polymerization is less than 300, the film shows lower mechanical strength, whereas when it exceeds 4000, the aqueous solution shows higher viscosity, which may cause inconvenience during film forming. The more preferable lower limit of the mean degree of polymerization is 400, particularly 500, and the more preferable upper limit is 3000, particularly 2000.

The film for packaging chemical agents of the present invention contains the above-mentioned EO-PVA (A) and C-PVA (B), wherein the weight ratio (A/B) of (A) and (B) is preferably 50/50–80/20. The lower limit of the weight ratio is preferably 60/40, particularly preferably 65/35. The upper limit thereof is preferably 75/25. When the weight ratio is less than 50/50, the solubility of the package of an acidic substance decreases and when it exceeds 80/20, the film has lower mechanical strength.

The film for packaging chemical agents of the present invention can be obtained by forming a film (filming) from a blend of the above-mentioned EO-PVA (A) and C-PVA (B). The method of film forming is not particularly limited and a known method can be used. An exemplary film forming by casting is as follows. Water is added to the blend (powder) to give a 10–50 wt % (more preferably 15–35 wt %) aqueous solution of the blend, and where necessary, a releasing agent (sorbitan ester ether and the like), a plasticizer (glycerine, diglycerine, polyethylene glycol, polypropylene glycol and the like), and an anti-cratering agent (polyoxyethylene alkyl phenyl ether and the like) are added in a proportion of 0.1–10 parts by weight (more preferably 0.3–5 parts by weight), 1–40 parts by weight (more preferably 3–35 parts by weight), and 0.1–10 parts by weight (more preferably 0.3–5 parts by weight), respectively, per 100 parts by weight of the blend. The mixture is cast on the surface of a metal roll having a surface temperature of about 90–100° C., whereby a film containing EO-PVA (A) and C-PVA (B) can be obtained.

The film for packaging chemical agents of the present invention preferably has a thickness of 10–70 μm, though it is subject to change depending on the kind of the chemical agent to be packaged and the use thereof. When the thickness is less than 10 μm, the mechanical strength of the film decreases and when it exceeds 70 μm, the solubility of the film decreases and efficiency in the film forming is degraded.

The surface of the film may be plane, but one surface or both surfaces of the film may be embossed or have a matte finish.

According to the present invention, for the improvement of the water-soluble property of the film, particularly that of the film when an acidic chemical agent is packaged, PVA (S-PVA) (C) containing sulfo may be preferably used in addition to the above-mentioned EO-PVA (A) and C-PVA (B).

S-PVA (C) can be also produced by an optional method. For example, 1) a monomer having sulfo and a vinyl ester compound are polymerized and then saponified, 2) a vinyl ester compound is polymerized in the presence of an alcohol having sulfo or a compound having sulfo and a functional group such as aldehyde, thiol and the like as a chain transfer agent, which is followed by saponification, 3) polyvinyl alcohol is treated with bromine, iodine and the like, and heated with aqueous acidic sodium sulfite solution, 4) polyvinyl alcohol is heated in aqueous conc. sulfuric acid solution, 5) polyvinyl alcohol is acetalized with an aldehyde compound having sulfo and the like. The methods 1) and 2) are explained in detail in the following.

1) A method wherein a monomer having sulfo and a vinyl ester compound are polymerized and then saponified.

The monomer having sulfo is exemplified by the following.

a) olefin sulfonic acid such as ethylenesulfonic acid, allylsulfonic acid, metaallylsulfonic acid and the like and salts thereof b) sulfoalkyl maleate of the following formulas (10) and (11), and alkaline metal and ammonium salt thereof

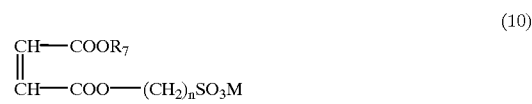

(10)

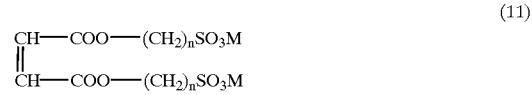

(11)

In the formulas (10) and (11), n is an integer of 2–4, and M is hydrogen atom, alkaline metal or ammonium ion.

Examples of the above-mentioned sulfoalkyl maleate include sodium sulfopropyl 2-ethylhexyl maleate, sodium sulfopropyl 2-ethylhexyl maleate, sodium sulfopropyl tridecyl maleate, sodium sulfopropyleicosyl maleate and the like.

c) sulfoalkyl (meth)acrylamide and sulfoalkyl (meth) acrylate of the following formulas (12)–(15)

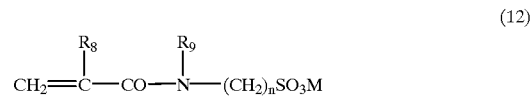

(12)

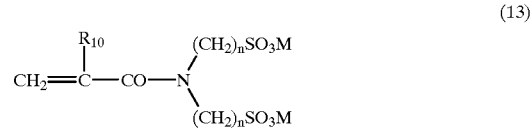

(13)

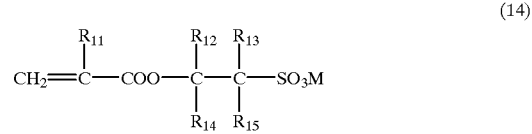

(14)

In the above-mentioned formulas (12)–(14), $R_8$, $R_9$, $R_{10}$, $R_{11}$, $R_{13}$, $R_{14}$ and $R_{15}$ are hydrogen atom or alkyl, $R_{12}$ is alkyl, n is an integer of 2–4, and M is hydrogen atom, alkaline metal or ammonium ion.

Examples of the above-mentioned sulfoalkyl(meth) acrylamide include sodium sulfomethylacrylamide, sodium sulfo t-butylacrylamide, sodium sulfo s-butylacrylamide, sodium sulfo t-butylmethacrylamide and the like.

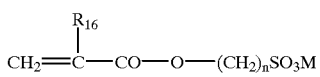
(15)

wherein $R_{16}$ is hydrogen or alkyl, n is an integer of 2–4, and M is hydrogen atom, alkaline metal or ammonium ion.

Examples of the above-mentioned sulfoalkyl (meth) acrylate include sodium sulfoethyl acrylate and the like.

d) sulfuric acid ester compound of the terminal hydroxyl of ethyleneoxide monoallyl ether of the following formula (16)

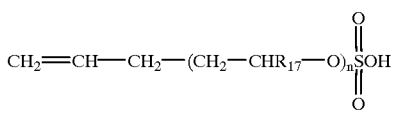
(16)

wherein $R_{17}$ is hydrogen or alkyl (preferably having 4 or less carbon atoms), and n is an integer of 1–60.

When it is introduced by copolymerization, olefin sulfonic acid or a salt thereof is preferably used from among the monomers having sulfo.

2) A method comprising polymerizing a vinyl ester compound in the presence of an alcohol having sulfo or a compound having sulfo and a functional group such as aldehyde, thiol and the like as a chain transfer agent, which is followed by saponification.

For this method, a compound derived from thiol having a particularly high chain transfer effect, such as the following compounds (17) to (19) and salts thereof, is used.

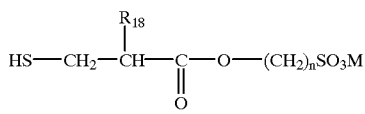
(17)

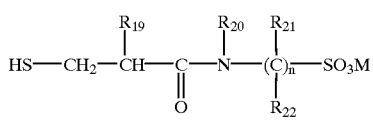
(18)

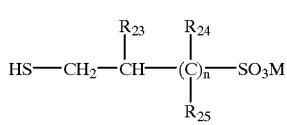
(19)

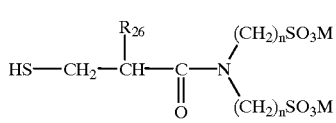
(20)

In the above-mentioned formulas (17)–(20), $R_{18}$–$R_{26}$ are each hydrogen or methyl, n is an integer of 2–4, and M is hydrogen atom, alkaline metal or ammonium ion.

Specific examples include thiopropionic acid sodium sulfopropane and the like.

As the vinyl ester compound for the production of the above-mentioned 1) and 2), those mentioned for the above-mentioned EO-PVA (A) can be used. In addition, other similar monomers can be used as long as the object of the present invention is not impaired.

Saponification can be carried out according to the saponification method of the above-mentioned EO-PVA (A).

In this way, S-PVA (C) to be used in the present invention can be obtained. According to the present invention, a sulfo content is preferably 1–10 mol %. When the content is less than 1 mol %, the solubility decreases and when it exceeds 10 mol %, the film strength becomes degraded. The more preferable lower limit of the content is 2 mol %, and the more preferable upper limit is 7 mol %, particularly 5 mol %.

The saponification degree of S-PVA (C) is not particularly limited, but 70–98 mol % is preferable. When the saponification degree is less than 70 mol %, the solubility decreases and when it exceeds 98 mol %, it also unpreferably decreases. The more preferable lower limit of the saponification degree is 75 mol %, particularly 80 mol %, and the more preferable upper limit is 97 mol %, particularly 96 mol %.

Moreover, the mean degree of polymerization of S-PVA (C) is not particularly limited, but 300–4000 is preferable. When the mean degree of polymerization is less than 300, the film shows lower mechanical strength, whereas when it exceeds 4000, the aqueous solution shows higher viscosity, which may cause inconvenience during film forming. The more preferable lower limit of the mean degree of polymerization is 400, particularly 500, and the more preferable upper limit is 3000, particularly 2000.

The content of S-PVA (C) is preferably not less than 10 parts by weight per 100 parts by weight of the total of EO-PVA (A) and C-PVA (B). When the content is less than 10 parts by weight, the solubility is not improved. The upper limit of the content is not particularly limited, but, in consideration of the economic aspect and the like, it is preferably not more than 30 parts by weight, more preferably not more than 25 parts by weight, particularly not more than 20 parts by weight.

For producing the film for packaging chemical agents, a predetermined amount of S-PVA (C) is admixed with a blend of EO-PVA (A) and C-PVA (B) and the resulting blend is subjected to the film forming steps.

The film for packaging chemical agents of the present invention may contain, as long as the object of the present invention is not impaired, other water-soluble polymer (sodium polyacrylate, polyethylene oxide, polyvinylpyrrolidone, dextrin, chitosan, chitin, methylcellulose, hydroxyethylcellulose, starch and the like), corrosion inhibitor, coloring agent, filler and the like. It is also possible to add titanium oxide, talc and the like.

The chemical agent to be packaged with the film of the present invention is free of any particular limitation, as long as it can be dissolved or dispersed in water. It could be alkaline, neutral or acidic, and the effect of the present invention can be sufficiently achieved when the chemical agent is alkaline (pH 9 or above upon dissolution or dispersion in water) or acidic (pH 5 or below upon dissolution or dispersion in water). The form of the chemical agent may be granule, tablet, powder and the like, or even a liquid.

Examples of the chemical agent include powdered soap, synthetic detergent, agricultural chemical, antibacterial, deodorant, insecticide and the like, preferably detergent and agricultural chemical. The film of the present invention is suitably used for packaging these chemical agents which are cast into water when in use.

When a chemical agent is packaged using the film of the present invention, for example, 1) the film is made into a bag and the chemical agent is packaged, 2) the chemical agent is directly packaged with the film or other method can be used without limitation.

The present invention is explained in detail by referring to examples and reference examples. The present invention is not limited by these examples in any way. In the examples, "%" and "parts" are based on weight, unless specifically indicated otherwise.

EXAMPLE 1

A blend of EO-PVA (A) (60 parts, containing oxyethylene by 3 mol %, having the number of moles of oxyalkylene of 8 on average, saponification degree 99.0 mol %, mean degree of polymerization 530) and C-PVA (B) (40 parts, modified with maleic acid by 2 mol %, saponification degree 93.0 mol %, mean degree of polymerization 1800) was dissolved in water to give a 30% aqueous solution, and glycerine (20 parts), sorbitan ester ether (0.5 part) and polyoxyethylene nonyl phenyl ether (0.5 part) were added per 100 parts of the blend. The mixture was cast and dried on the surface of a metal roll having a surface temperature of about 94° C. to give a film for packaging chemical agents of the present invention, which had a thickness of 40 $\mu$m.

The obtained film for packaging chemical agents was subjected to the following evaluation.

Water-Soluble Property

From the obtained film for packaging chemical agents, a three-side-sealed bag (100 mm×150 mm, seal width 5 mm) was produced. As the chemical agent, succinic acid (20 g, acidic chemical agent having pH 2 in a 1% aqueous solution) was placed therein and the openings were heat-sealed. The bag was left standing at 40° C. for one month and the bag containing the chemical agent was placed in a 1000 ml beaker containing 1000 cc of water (10° C.). The water was stirred with a magnetic stirrer at about 480 rpm and 20° C., 65% RH, and the time (sec) necessary for complete dissolution of the bag was measured.

The bag before containing the chemical agent (before standing) was separately measured for solubility in the same manner.

Similar evaluation was conducted using sodium carbonate (alkaline chemical agent having pH 11 in a 1% aqueous solution) as the chemical agent.

Impact Strength

The impact strength of the obtained film for packaging chemical agents was measured according to JIS P 8134. The diameter of the hemispherical head part was 20 mm.

EXAMPLE 2

In the same manner as in EXAMPLE 1 except that PVA (containing oxyethylene having the number of moles of oxyalkylene of 15 on average by 1 mol %, saponification degree 93 mol %, mean degree of polymerization 670) was used as EO-PVA (A), a film for packaging chemical agents was obtained and evaluated similarly.

EXAMPLE 3

In the same manner as in Example 1 except that PVA (modified with itaconic acid by 2 mol %, saponification degree 91 mol %, mean degree of polymerization 1700) was used as C-PVA (B), a film for packaging chemical agents was obtained and evaluated similarly.

EXAMPLE 4

In the same manner as in Example 1 except that the contents of EO-PVA (A) and C-PVA (B) were set for 80 parts and 20 parts, respectively, a film for packaging chemical agents was obtained and evaluated similarly.

EXAMPLE 5

In the same manner as in Example 1 except that S-PVA (C) (modified with allyl sulfonic acid by 3 mol %, saponification degree 88.0 mol %, mean degree of polymerization 300) was added by 10 parts per 100 parts of the total of EO-PVA (A) and C-PVA (B), a film for packaging chemical agents was obtained and evaluated similarly.

EXAMPLE 6

In the same manner as in Example 2 except that S-PVA (C) (modified with allyl sulfonic acid by 3 mol %, saponification degree 88 mol %, mean degree of polymerization 300) was added by 10 parts per 100 parts of the total of EO-PVA (A) and C-PVA (B), a film for packaging chemical agents was obtained and evaluated similarly.

EXAMPLE 7

In the same manner as in Example 3 except that S-PVA (C) (modified with allyl sulfonic acid by 3 mol %, saponification degree 88 mol %, mean degree of polymerization 300) was added by 10 parts per 100 parts of the total of EO-PVA (A) and C-PVA (B), a film for packaging chemical agents was obtained and evaluated similarly.

EXAMPLE 8

In the same manner as in Example 4 except that S-PVA (C) (modified with allyl sulfonic acid by 3 mol %, saponification degree 88 mol %, mean degree of polymerization 300) was added by 10 parts per 100 parts of the total of EO-PVA (A) and C-PVA (B), a film for packaging chemical agents was obtained and evaluated similarly.

REFERENCE EXAMPLE 1

In the same manner as in Example 1 except that C-PVA (B) was not added and 100 parts of EO-PVA (A) was used, a film for packaging chemical agents was obtained and evaluated similarly.

REFERENCE EXAMPLE 2

In the same manner as in Example 1 except that EO-PVA (A) was not added and 100 parts of C-PVA (B) was used, a film for packaging chemical agents was obtained and evaluated similarly.

The evaluation results of Examples and Reference Examples are shown in Table 1.

TABLE 1

| | water-solubility of bag containing acidic chemical agent (sec) | | water-solubility of bag containing alkaline chemical agent (sec) | | impact strength (N cm) |
|---|---|---|---|---|---|
| | Before standing | After standing | Before standing | After standing | |
| Example 1 | 30 | 50 | 30 | 40 | 240 |
| Example 2 | 25 | 43 | 25 | 38 | 250 |
| Example 3 | 33 | 52 | 33 | 45 | 240 |
| Example 4 | 35 | 40 | 35 | 46 | 170 |

TABLE 1-continued

|  | water-solubility of bag containing acidic chemical agent (sec) | | water-solubility of bag containing alkaline chemical agent (sec) | | impact strength (N cm) |
| --- | --- | --- | --- | --- | --- |
|  | Before standing | After standing | Before standing | After standing |  |
| Example 5 | 25 | 43 | 25 | 35 | 220 |
| Example 6 | 23 | 38 | 23 | 39 | 230 |
| Example 7 | 30 | 49 | 30 | 42 | 220 |
| Example 8 | 33 | 39 | 33 | 44 | 160 |
| Reference Example 1 | 45 | 48 | 45 | 55 | 140 |
| Reference Example 2 | 30 | Undissolved | 30 | 42 | 240 |

This application is based on a patent application No. 2000-142942 filed in Japan, the content of which is hereby incorporated by reference.

What is claimed is:

1. A film for packaging chemical agents, which comprises an oxyalkylene-containing polyvinyl alcohol resin (EO-PVA) (A) and a carboxyl-containing polyvinyl alcohol resin (C-PVA) (B), wherein the EO-PVA (A) and the C-PVA (B) are comprised in a weight ratio (A/B) of 60/40–80/20.

2. The film for packaging chemical agents according to claim 1, wherein the EO-PVA (A) comprises an oxyalkylene unit in a proportion of 1–10 mol %, and the C-PVA (B) comprises a carboxy group in a proportion of 1–10 mol %.

3. The film for packaging chemical agents according to claim 1, which further comprises a sulfo-containing polyvinyl alcohol resin (S-PVA) (C).

4. The film for packaging chemical agents according to claim 3, wherein the S-PVA (C) comprises a sulfo group in a proportion of 1–10 mol %.

5. The film for packaging chemical agents according to claim 3, wherein the S-PVA (C) is comprised in a proportion of 10–30 parts by weight per 100 parts by weight of the EO-PVA (A) and the C-PVA (B) in total.

6. The film for packaging chemical agents according to claim 4, wherein the S-PVA (C) is comprised in a proportion of 10–30 parts by weight per 100 parts by weight of the EO-PVA (A) and the C-PVA (B) in total.

* * * * *